(12) United States Patent
Nakamura et al.

(10) Patent No.: US 6,263,499 B1
(45) Date of Patent: Jul. 17, 2001

(54) UPGRADING AN APPLICATION SOFTWARE TO BE USED, BY COMMUNICATION

(75) Inventors: Toshiki Nakamura, Tachikawa; Tatsuya Ueda, Ome, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/526,966

(22) Filed: Mar. 16, 2000

Related U.S. Application Data

(62) Division of application No. 08/929,605, filed on Sep. 15, 1997, now Pat. No. 6,134,711.

(30) Foreign Application Priority Data

Sep. 20, 1996 (JP) .................................................. 8-250617

(51) Int. Cl.[7] .................................................... G06F 9/445
(52) U.S. Cl. ............................................. 717/11; 345/336
(58) Field of Search ........................... 717/1, 2, 3, 11; 709/216–223; 463/25, 40, 44; 455/419; 345/333–339, 351–352, 353

(56) References Cited

U.S. PATENT DOCUMENTS

| | | | | |
|---|---|---|---|---|
| 4,947,346 | * | 8/1990 | Kamiya | 395/337 |
| 4,964,077 | * | 10/1990 | Eisen et al. | 395/337 |
| 4,999,806 | * | 3/1991 | Chernow et al. | 395/712 |
| 5,051,822 | * | 9/1991 | Rhoades | 463/25 |
| 5,201,034 | * | 4/1993 | Matsuura et al. | 395/337 |
| 5,235,679 | * | 8/1993 | Yoshizawa et al. | 395/336 |
| 5,388,211 | * | 2/1995 | Hornbuckle | 395/712 |
| 5,425,140 | * | 6/1995 | Bloomfield et al. | 395/353 |
| 5,459,488 | * | 10/1995 | Geiser | 345/173 |
| 5,535,321 | * | 7/1996 | Massaro et al. | 395/337 |
| 5,632,681 | * | 5/1997 | Bakoglu et al. | 463/44 |
| 5,664,778 | * | 9/1997 | Kikuchi et al. | 273/148 B |
| 5,667,440 | * | 9/1997 | Sasaki et al. | 463/29 |
| 5,721,827 | * | 2/1998 | Logan et al. | 709/217 |
| 5,751,271 | * | 5/1998 | Anstotz et al. | 345/146 |
| 5,799,292 | * | 8/1998 | Hekmatpour | 706/11 |
| 5,813,913 | * | 9/1998 | Berner et al. | 463/40 |
| 5,821,928 | * | 10/1998 | Melkus et al. | 345/337 |
| 5,861,884 | * | 1/1999 | Fujioka | 345/338 |
| 5,896,566 | * | 4/1999 | Averbuch et al. | 455/419 |
| 5,907,617 | * | 5/1999 | Ronning | 380/4 |
| 5,956,505 | * | 9/1999 | Manduley | 395/712 |

FOREIGN PATENT DOCUMENTS 7-160459  6/1995  (JP) .

OTHER PUBLICATIONS

No Author, "on Line Gaming", Popular Science, Dec. 1994 pp 94–116.*

Broida, "Modem Combat", Compute, Sep. 1994, start p. 86.*

Ginsburg, "Times Up! Clocking the kids on the computer", Netguide, Jun. 1996, start p. 51.*

* cited by examiner

*Primary Examiner*—Kakali Chaki
(74) *Attorney, Agent, or Firm*—Frishauf, Holtz, Goodman, Langer & Chick, P.C.

(57) ABSTRACT

A communication device sends use status data representing a state of use thereof to an external communication device. Receiving the use status data, the external communication device sends the first-mentioned communication device a releasing signal to release the first-mentioned communication device from inhibition of fulfillment of a function stored beforehand. In response to the releasing signal, the first-mentioned communication device reads and fulfills the stored function.

3 Claims, 14 Drawing Sheets

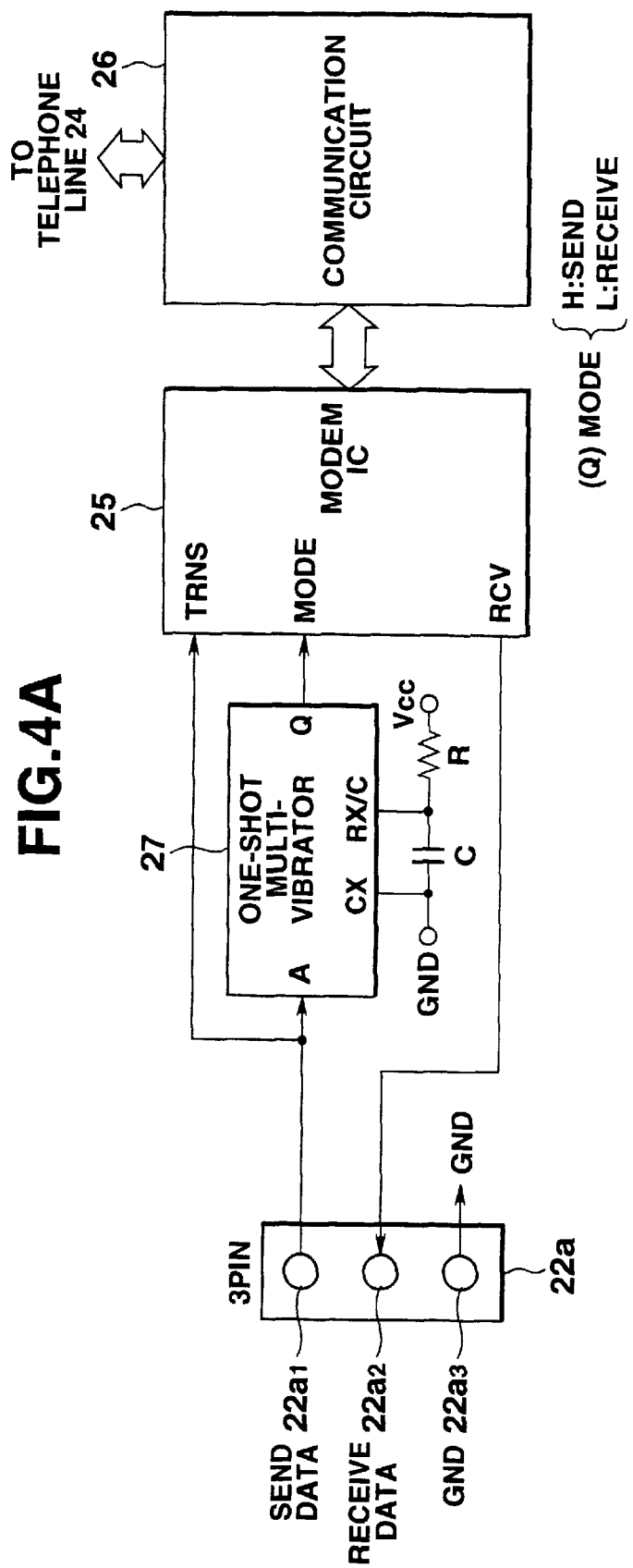
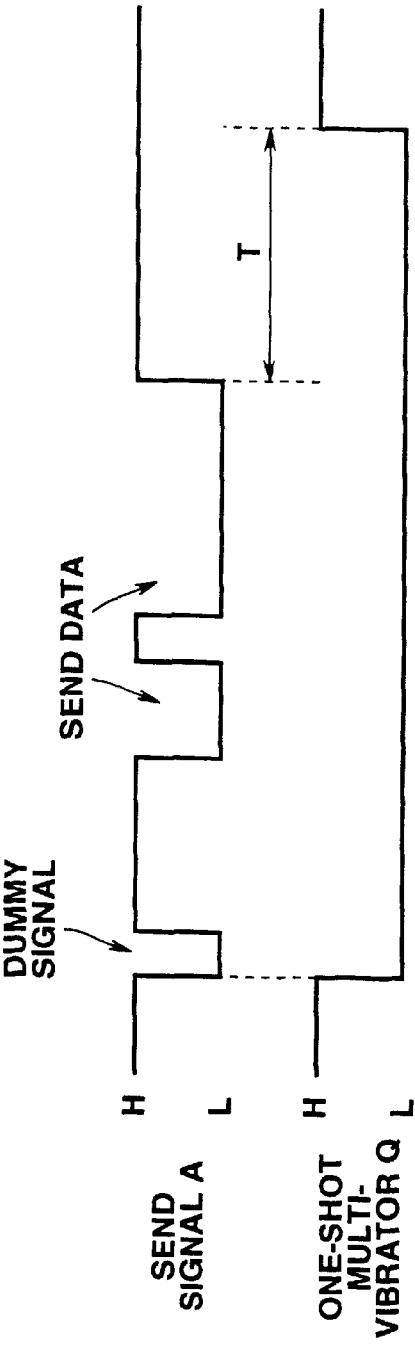
FIG.4A
FIG.4B

UPGRADING AN APPLICATION SOFTWARE TO BE USED, BY COMMUNICATION This is a division of application Ser. No. 08/929,605 filed Sep. 15, 1997, now U.S. Pat. No. 6,134,711.

BACKGROUND OF THE INVENTION

1. Field of the Invention

The present invention relates to communication devices and methods and recording mediums which contain a communication program, and more particularly to upgrading functions of software used in the communication device and method by communicating with an external device depending on the status of use of a program stored in the communication device and a user's skill level of manipulating the program.

2. Background Art

A user can repeatedly play several games installed in a conventional electronic notebook having a game function. However, the procedures for playing the respective games and the contents of the respective games are unchanged and the procedures for advancing the respective games are predetermined. Thus, once the processes of playing all the respective games are mastered, the results of playing the respective games will be known before the respective games are started or in the course of progress of the respective games. Thus, interest would be lost.

That is, once the user masters several functions provided in a conventional electronic device, the user can not obtain new functions, and an interest in the use of such electronic device would be lost.

Recently, application software having various functions have been developed one after another and their functions are increasing in number and have become complicated, which is very convenient to a user who has become familiar with those software applications, but bad effects such as an increase unnecessary functions and difficult operations and a reduction in processing speed have been produced on beginners or the users who use only the basic functions.

SUMMARY OF THE INVENTION

It is therefore an object of the present invention to provide communication devices and methods and recording mediums which contain a communication program which obtains new functions sequentially by communication with an external device to increase an interest in using such communication devices and methods and the recording medium and to perform processing operations, using functions depending on a user's manipulative level.

In order to achieve the above object, according to the present invention, there is provided a communication device which sends a predetermined signal to an external communication device, which when same receives the predetermined signal, sends the first-mentioned communication device a releasing signal to release the first-mentioned communication device from inhibition of fulfillment of at least one function, comprising:

function storage means which contains data on at least one function to be fulfilled in the first-mentioned communication device;

use status storage means for storing use status data representing the status of use of the first-mentioned communication device;

communication executing means for executing communication with the external communication device;

sending means responsive to the communication executing means executing communication for sending the external communication device the use status data on the first-mentioned communication device stored in the status storage means; and control means responsive to the releasing signal which the external communication device has sent in response to the use status data sent by the sending means for reading function data stored in the function storage means and for fulfilling a corresponding function.

Thus, according to the present invention, the processing is not determined by the functions provided initially in the notebook, but new functions are sequentially obtained to thereby increase an interest in the use of the notebook. Only functions depending on the user's manipulative level are obtained, so that the inventive communication device is easy to handle.

DESCRIPTION OF THE DRAWINGS

FIG. 4A shows the internal structure of the modem connected to a telephone line in communication with the electric notebook;

FIG. 4B is a timing chart of an operation of the modem;

DESCRIPTION OF THE PREFERRED EMBODIMENTS

Embodiments of the present invention will be described next with reference to the accompanying drawings.

First Embodiment

Figure 1:
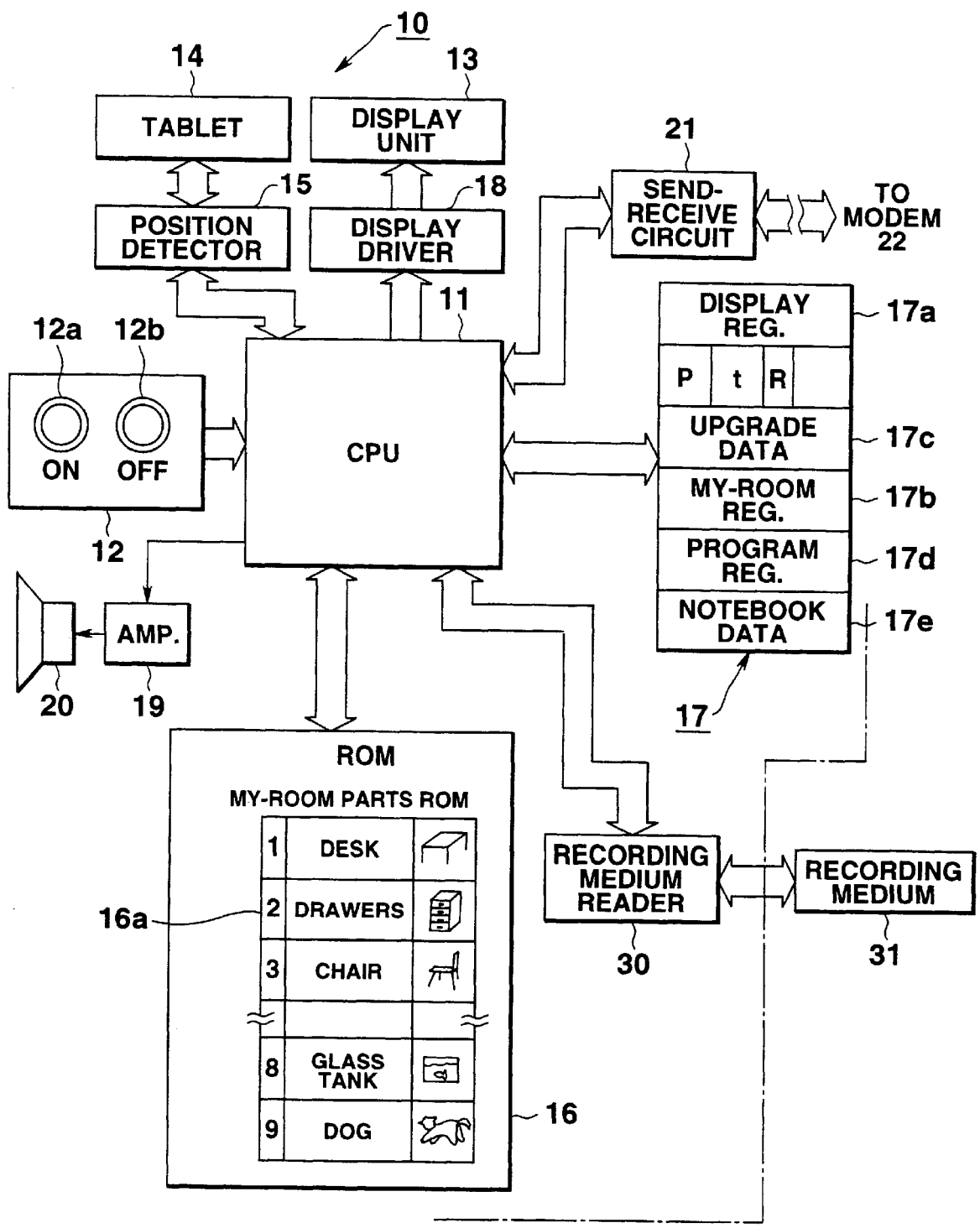
FIG. 1 is a block diagram of an electronic circuit of an electronic notebook involved in an embodiment of a communication device and method and a recording medium which contains a communication program, according to the present invention.

FIG. 1 is a block diagram of an electronic circuit of an electronic notebook 10 involved in a first embodiment of a communication device and method and a recording medium which contains a communication program, according to the present invention. The electronic notebook 10 is provided with a controller (CPU) 11, which starts up a system program contained in a ROM 16 in accordance with a key operation signal entered from a key-in unit 12, or touch position data entered via a position detector 15 from a tablet 14 overlapping with a display screen of a liquid crystal display unit 13 to thereby control the respective operations of the circuit elements. The controller 11 is connected to a RAM 17 and to the liquid crystal display unit 13 via a display driver 18.

The controller 11 is connected to a speaker 20 via an amplifier 19; to an external modem 22 via a send-receive circuit 21; and to a host computer (not shown) via a telephone line for communicating purposes.

The key-in unit 12 is provided with an ON key 12a operated to turn on a power supply of the electronic notebook 10 and an OFF key 12b operated to turn off the power supply.

The tablet 14 is made of a transparent panel overlapping on the display screen of the liquid crystal display unit 13 and outputs a voltage signal representing a position touched, for example, with a pen E. In accordance with the voltage signal outputted from the tablet 14 depending on the position touched with the pen E, the position detector 15 detects the coordinates of the position touched with the pen E in an X–Y coordinate system corresponding to a displayed area of the liquid crystal display unit 13 and delivers data indicative of the position coordinates to the controller 11.

The controller 11 determines the coordinate data corresponding to the touched position on the liquid crystal display unit 13 and the contents of data (for example, an icon) displayed at the touched position.

In addition to the system program, the ROM 16 contains subprograms corresponding to various operational modes such as a notebook mode and a my-room mode. The ROM 16 further contains a my-room-part subROM 16a which contains images of different pieces of furniture, articles attached to the furniture, and animals/plants, as room parts. (In FIGS. 1(16a), 7D and 12, "DRAWINGS" stands for "A CHEST OF DRAWERS".)

The RAM 17 is provided with a display register 17a in which data to be displayed on the liquid crystal display unit 13 stored as bit map data; a my-room register 17b in which the kinds of part images selected as components of a room image from the my-room-part subROM 16a and information on a specified display positions are stored in a set my-room mode; a use frequency register P in which data representing a use frequency of the electronic notebook 10 is set, the data being incremented one when the notebook 10 is used once (each time a cleaning process ends in the my-room mode, or each time the communication mode ends); an upgrade data register 17c to and in which when the use frequency data set in the use frequency data register P reaches a predetermined level, for example, of "5" or "10", the use frequency data is transferred and stored as upgrade data; an upgrade status register t where an upgrade level is set as 0, 1 or 2 depending on the upgrade data "0", "5"or "10"stored in the upgrade data register 17c as an upgraded-menu item is selected in the communication mode; a notebook data register 17e where, for example, schedule data inputted in the set notebook mode is stored and entered; and a program register 17d which stores a program installed externally.

In a second embodiment of the present invention to be described later, program register 17d contains a word processor program read from a recording medium. A register R indicates a total accumulated time in which the word processor mode is used.

The speaker 20 produces an electronic sound depending on a sound generating command signal from the controller 11. For example, it generates a confirming sound "pi" each time a pen touch operation is performed on the tablet 14 or an alarm sound "pi:" each time a misoperation is performed.

The send-receive circuit 21 sends/receives data to/from the host computer (not shown) via the modem 22 and telephone line in a state where the electronic notebook 10 is set in the communication mode. For example, when an upgraded menu is selected in the communication mode, the send-receive circuit 21 sends upgrade data stored in the upgraded data register 17c to the host computer, and receives an upgrade limitation releasing signal by return from the host computer.

In this case, if the upgrade data is "5", the send-receive circuit 21 receives a first-stage limitation releasing signal, so that the upgrade level is increased from "0" to "1". If the upgrade data is "10", the send-receive circuit 21 receives a second-stage limitation releasing signal, so that the upgrade level is increased from "1" to "2".

When a room part image is selected and read from the my-room-part subROM 16a in the my-room mode, the kinds of selectable room part images vary depending on the upgrade level set in the upgrade status register t. For example, in this embodiment, when the upgrade level is 0, only five different pieces of furniture images are selectable; when the upgrade level is 1, all pieces of furniture images are selectable; and when the upgrade level is 2, all pieces of furniture images and animal and plant images are selectable.

The recording medium reader 30 reads data in various replaceable recording mediums 31 such as ROM/RAM cards or ROM/RAM disks. The data recorded in the various recording mediums 31 read by the recording medium reader 30 are data of programs similar to those stored in ROM 16. The controller 11 is capable of performing various processes in the electronic notebook 10 on the basis of program data read by the recording medium reader 30.

Figure 2:
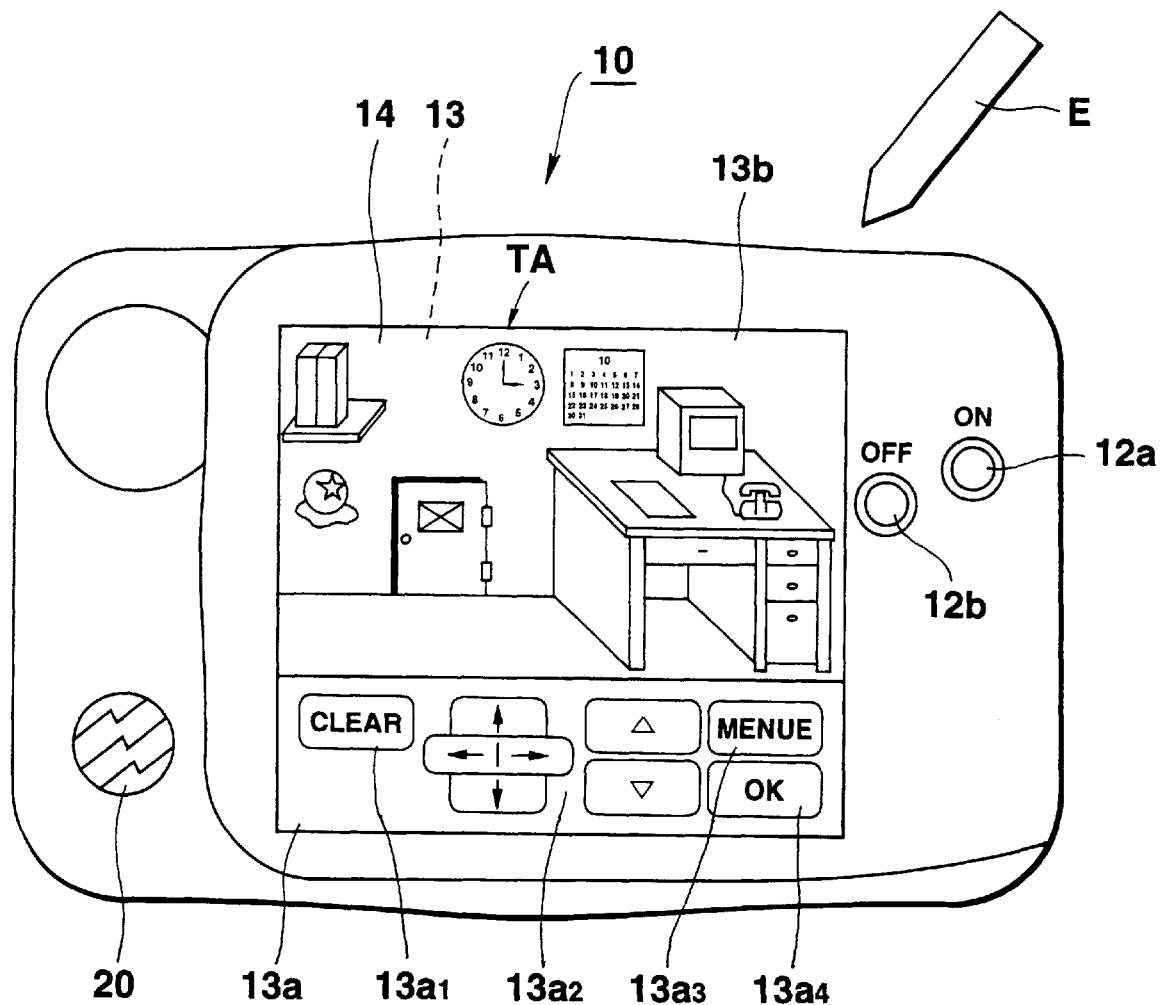
FIG. 2 is a front view of the electronic notebook.

FIG. 2 is a front view of the electronic notebook 10 which has a housing of such a size that the user can hold the housing sufficiently by one hand. The housing has at its center a touch panel TP composed of the liquid crystal display unit 13 and the tablet 14 overlapping with the display unit 13; power supply keys 12a, 12b provided on the right side of the touch panel TA; and a speaker 20 provided on the left side of the touch panel.

The input display screen of the touch panel TA is separated into a key operation area 13a provided in a lower portion of the input display screen, and a data display area 13b of the input display screen above the key operation area 13a. Displayed and disposed in the key operation area 13a are "clear" key $13a_1$, cursor keys $13a_2$ $(,+,\leftarrow,\rightarrow,\Delta,\nabla)$, "menu" key $13a_3$, and "OK" key $12a_4$.

The data display area 13b of the touch panel TA of the FIG. 2 notebook 10 shows a displayed menu display screen. When, for example, a "door" is selected in a pen-touching operation, the my-room mode is set; when a "personal computer" is selected, the communication mode is set; when a "calendar" is selected, the schedule mode is set; and when a "book" is selected, a dictionary mode is set.

Figure 3:
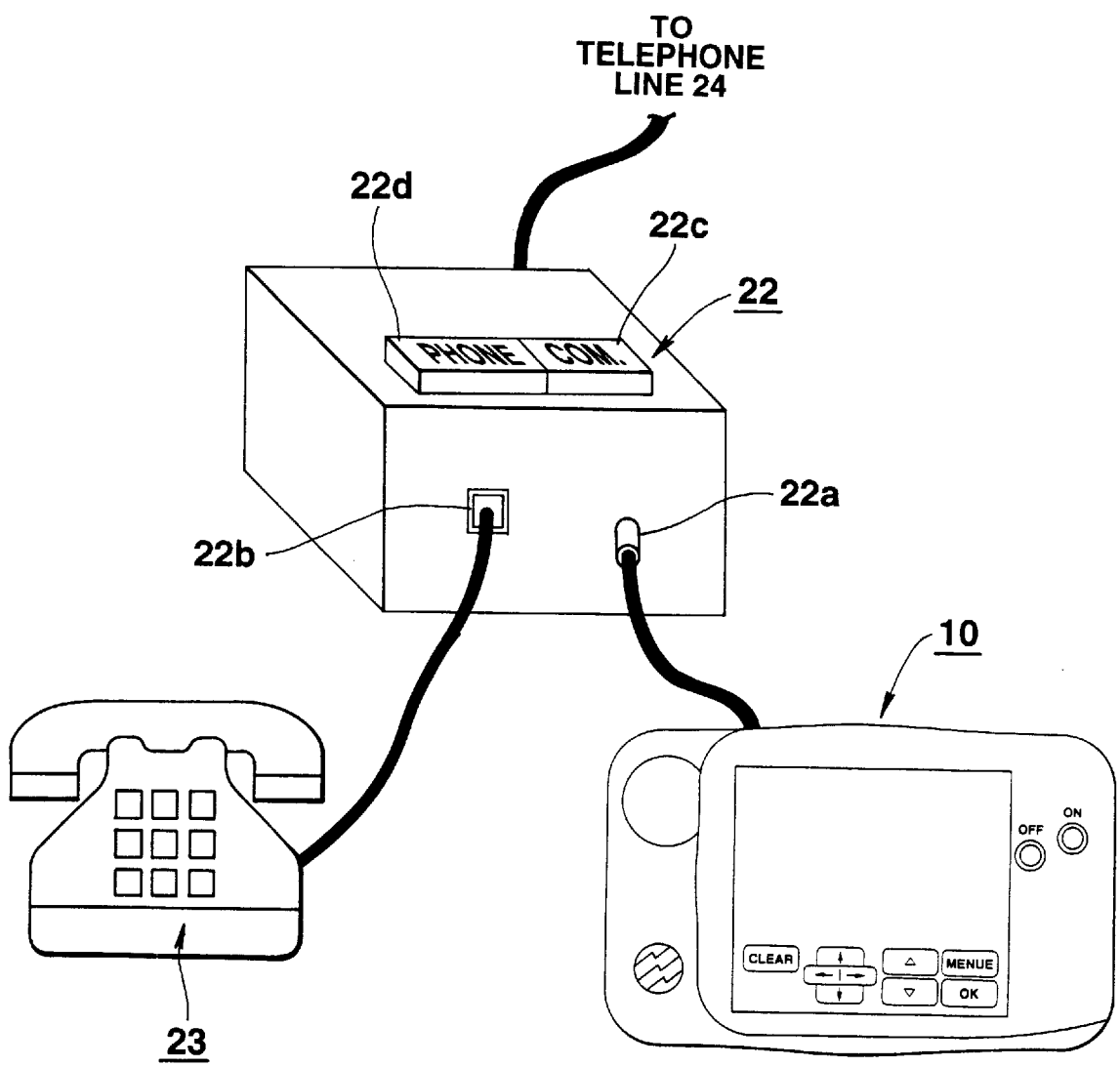
FIG. 3 shows a send-receive circuit of the electronic notebook and a modem connected to the send-receive circuit.

FIG. 3 shows the modem 22 connected to a telephone set 23 and the send-receive circuit 21 of the electronic notebook 10. The modem 22 is provided on one side with a 3-pin terminal 22a to which a communication cable extending from the send-receive circuit 21 of the notebook is connected, and a modular terminal 22b to which a communication cable extending from the telephone set 23 is connected. The modem 22 is also provided at its front with a "communication" switch 22c and a "telephone" switch 22d for selecting a communication mode for the electronic notebook 10 and a telephone mode for the telephone set 23, respectively, whereby communication based on the connection of the electronic notebook 10 to the telephone line 24 and telephonic communication based on the connection of the telephone 23 to the telephone line 24 are respectively had.

FIG. 4A shows the internal structure of the modem 22. FIG. 4B is a timing chart of the modem 22 operation.

The modem 22 is provided with the above-mentioned 3-pin terminal 22a which is composed of a send data line connector pin $22a_1$, a receive data line connector pin $22a_2$, and a GND line connection pin $22a_3$; a modem IC 25; a communication circuit 26; and a monostable multivibrator 27.

The output Q of the monostable multivibrator 27 becomes low with a falling edge of a send signal A input from connector pin $22a_1$, and becomes high a given time T which is a CR time constant after the send signal A disappears.

The modem IC 25 is set in a send mode when its MODE terminal is low while the modem IC 25 is set in the receive mode when the MODE terminal is high. In the send mode where an edge of the send signal A falls, the send data input to a TRNS terminal is modulated by the communication circuit 26 and the resulting data is outputted to the telephone line 24. In the receipt mode the given time T after disappearance of the send signal A, the receive data input from the telephone line 24 is demodulated by the communication circuit 26, and the resulting data is outputted as digital data from a RCV terminal to the 3-pin connector terminal $22a_2$.

A dummy signal is added to the send signal A from the electronic notebook 10 immediately before a main data of the send data of the send signal A is sent. The dummy signal sets the output Q of the monostable multivibrator 27 at low level to thereby set the modem IC 25 in the send mode.

The modem 22 is automatically switched to the send mode in accordance with the output of the send data from the notebook 10. When the output of the send data disappears, the modem 22 is automatically switched to the receive mode the given time T after the disappearance of the send data. Therefore, a control system which switches between the send and receive modes and a control line therefor are not required to be provided for the electronic notebook 10, and hence the electronic notebook itself is reduced in size and cost.

The operation of the electronic notebook will be described next.

Figure 5:
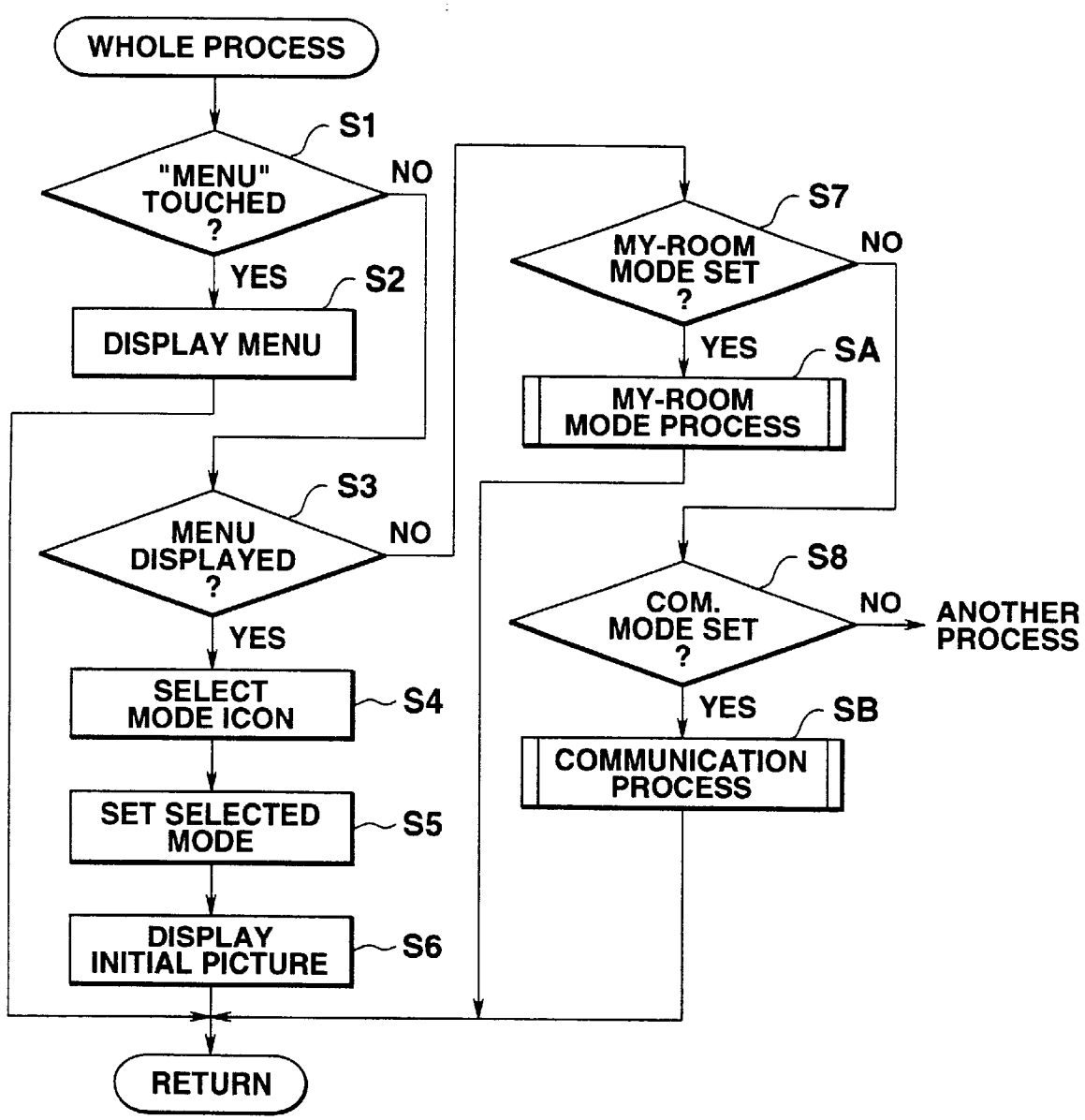
FIG. 5 is a flow chart of a whole operation of the electronic notebook.
Figure 6:
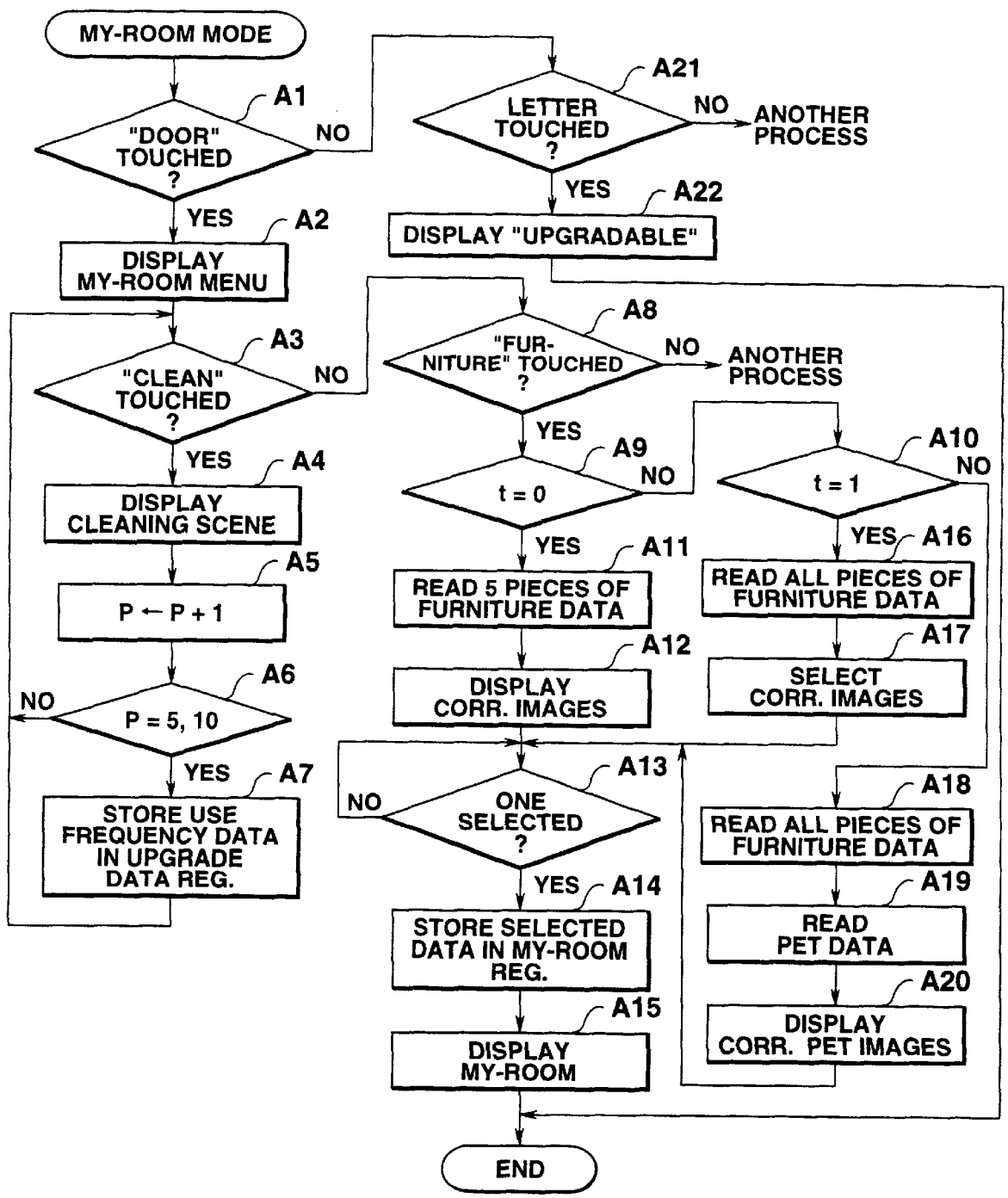
FIG. 6 is a flow chart of a my-room mode process performed in the electronic notebook.

FIG. 5 is a flow chart of a whole process performed by the electrode notebook. FIG. 6 is a flow chart of a my-room mode process of the electronic notebook. FIGS. 7A–7E each show the display of an operation of the electronic notebook involved in the my-room mode process (part 1). FIGS. 8A and 8B each show the display of an operation of the electronic notebook involved in the my-room mode (part 2).

Figure 7A:
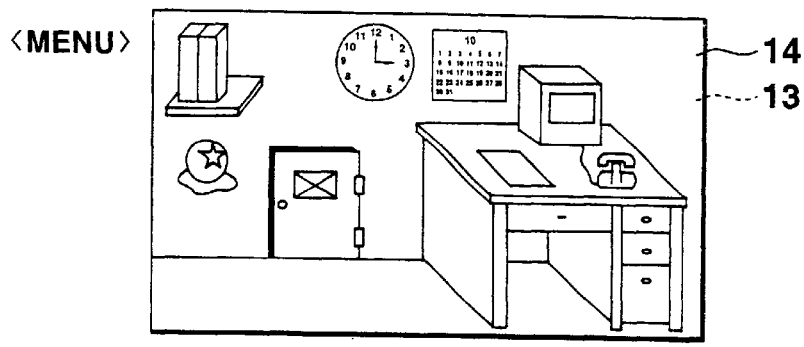
FIGS. 7A–7E each show the display of a result of an operation of the electronic notebook involved in the my-room mode process (part 1)
Figure 7B:
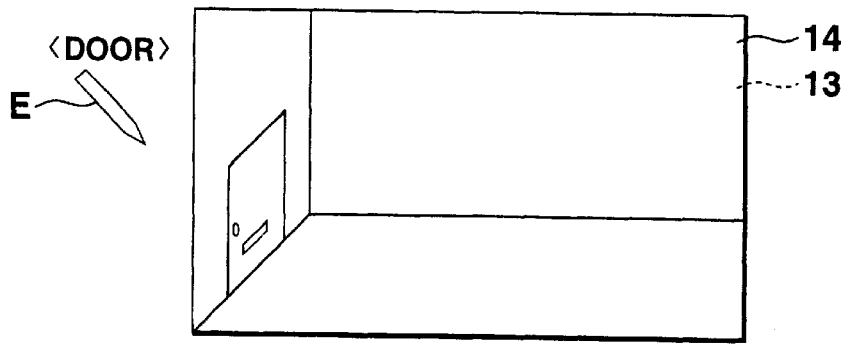
Figures 8A, 8B:
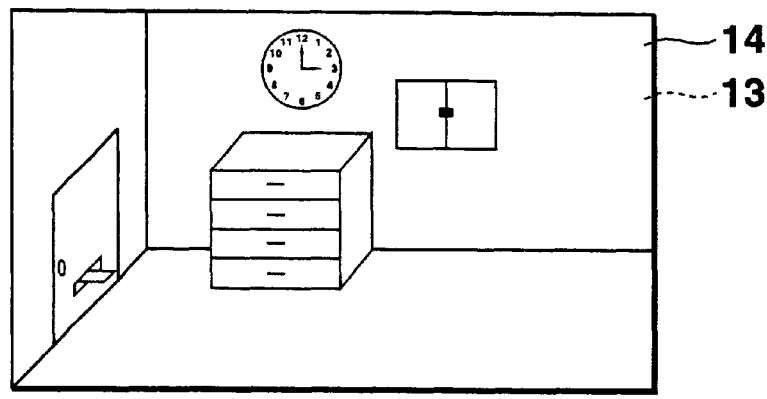
FIGS. 8A and 8B each show the display of a result of the operation of the electronic notebook involved in the my-room mode (part 2)

When the "menu" key $13a_3$ on the touch panel TP is touched, a menu select display screen for selecting the respective operational modes in a pen-touching operation is displayed on the display unit 13, as shown in FIG. 7A (step S1→S2).

When any one of mode icons "door", "personal computer", "calendar", etc., is selected in a pen touching operation on the displayed menu select display screen, the corresponding selected operational mode is set and the corresponding control program is started up, and an initial display screen in the set operational mode is displayed on the display unit 13 (steps S3→S4, S5, S6).

When the "door" of the menu select display picture is pen-touched in the mode selecting and setting process (steps S1–S6) to thereby set the my-room mode, a my-room display picture which is composed of combined room part images stored in the my-room register 17b of PAM 17 (initially, no room part images are entered) is displayed as an initial display picture on the display unit 13, and the my-room mode process for creating and displaying a desired room image is started up (step S7→SA).

When upgrade data has been stored in the upgrade data register 17c of RAM 17, the display unit displays a part image which represents a letter inserted into a drop in the door is displayed, which represents that room part images are upgradable (that is, the number of room part images is increasable) (FIG. 8A).

Figure 10A:
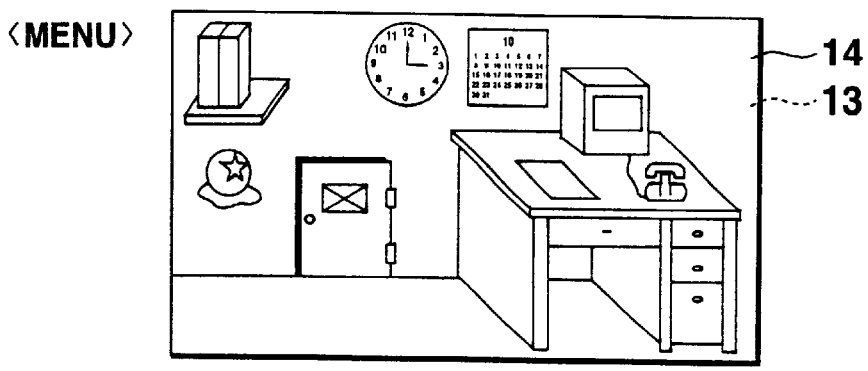
FIGS. 10A–10D each show the display of a result of an operation of the electronic notebook involved in the communication mode process (part 1)
Figure 10B:
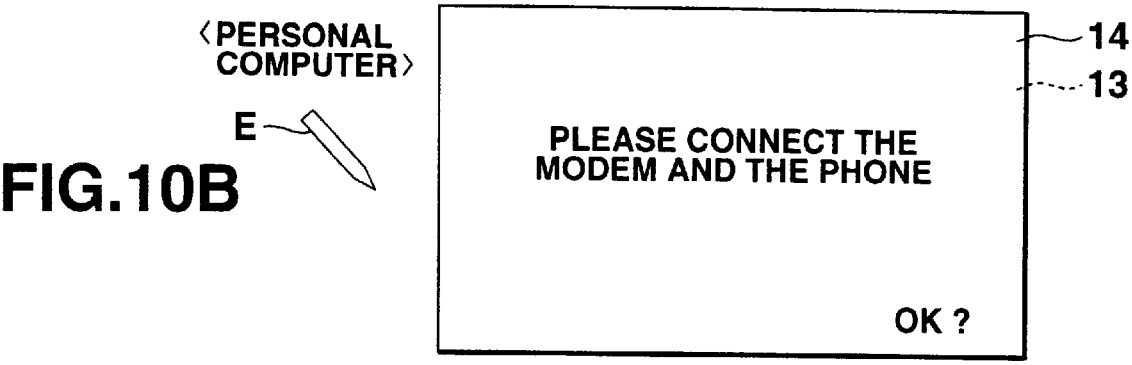

When the "personal computer" of the menu select display picture is pen-touched in the mode selecting and setting process (steps S1–S6) to thereby.set the communication mode, a message display picture for communication guidance is displayed as an initial display picture on the display unit 13, as shown in FIG. 10B, to thereby start up a communication mode process for desired data communication (step S8→SB).

When one of other notebook modes (schedule mode, memorandum mode, clock mode) is selected and set, a corresponding operational mode process is started up (step S8→another process).

Figure 7C:
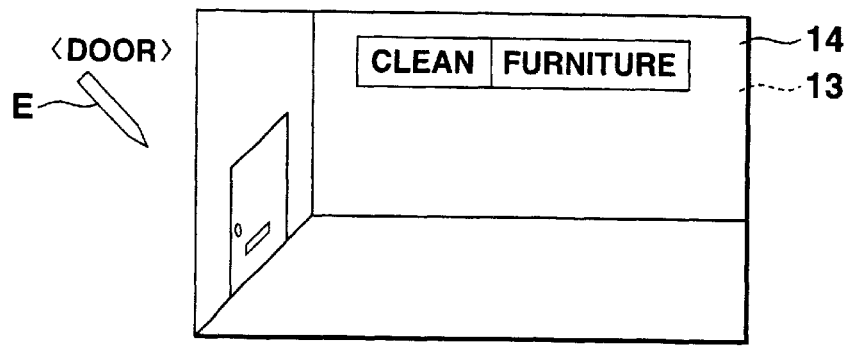
Figure 7D:
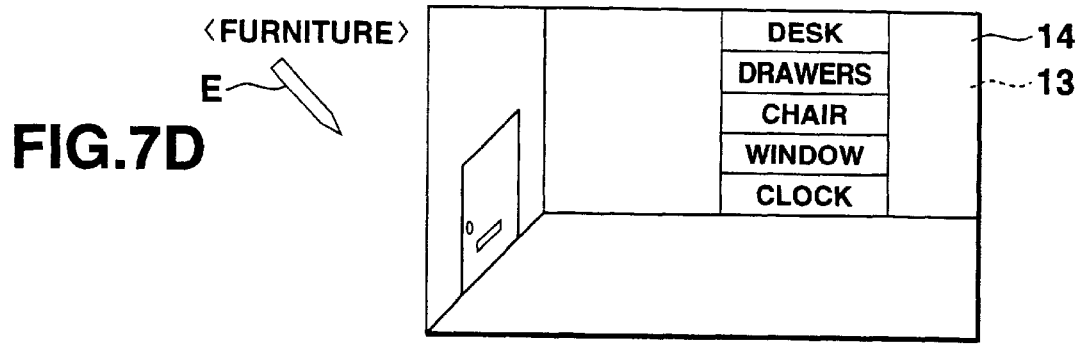

When the "door" displayed on the my-room display picture which is the initial display picture where the my-room mode is set is touched with the pen, a my-room menu display picture for selecting "clean" or "furniture"is displayed on the display unit 13, as shown in FIG. 7C (step A1→A2).

When the "clean" is pen touched on the displayed my-room menu display picture, an image of a scene where a person is cleaning a room is displayed on the my-room display picture which is, in turn, displayed on the display unit 13 (step A3→A4).

In response to this operation, the use frequency data in the use frequency register P of the RAM 17 is incremented by one, and it is determined whether the use frequency data has reached "5" or "10" (step A5, A6).

When it is determined that the use frequency data is not "5" or "10", the my-room menu display picture of FIG. 7C is restored a predetermined time later. If it is determined that the use frequency data is "5" or "10", the use frequency data "5" or "10" is stored in the upgrade data register 17c of RAM 17, and the my-room menu display picture of FIG. 7C is then restored (steps A6→A7).

When the "furniture" is pen touched in the displayed my-room menu display picture of FIG. 7C, it is determined whether the upgrade level set in the upgrade status register t of RAM 17 is "0" for a regular state or "1" for a first upgrade state or "2" for a second upgrade state (step A8→A9 or A10).

If it is determined that the upgrade level set in the upgrade status register t is "0" for the regular state, data on only five pieces of furniture images are read out from the my-room-part subROM 16a, and a my-room furniture select picture for selecting any one of five pieces of furniture images corresponding to the data on five-pieces of furniture is displayed on the display unit 13 (step A9→A11, A12).

If it is determined that the upgrade level set in the upgrade status register t is "1" for the first upgrade state, data on all pieces of furniture images are read out from the my-room-part subROM 16a, and a my-room furniture select picture for selecting any one of all pieces of furniture images corresponding to the data on all pieces of furniture images is displayed on the display unit 13 (step A10→A16, A17).

If it is determined that the upgrade level set in the upgrade status register t is "2" for the second upgrade state, data on all pieces of furniture, animal and plant images are read out from the my-room-part subROM 16a, and a my-room-part select picture for selecting any one of all pieces of furniture images, animal images and plant images corresponding the data on all pieces of furniture, animal and plant images is displayed on the display unit 13 (step A10→A18, A19, A20).

Figure 7E:
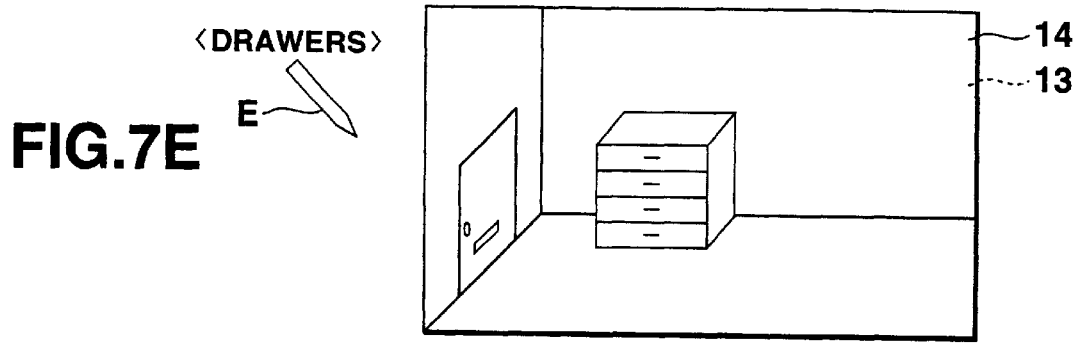

When any one of the part images is selected in the pen touching operation in a state where the my-room part select display picture is displayed at any one of the steps A12, A17 and A20, data on the selected part image is stored as one which composes a part of the my-room image in the my-room register 17b, the room part image corresponding to the selected and stored part image is read out from the my-room-part subROM 16a. When, for example, a "chest of drawers" is selected, a chest of drawers image as a part image is combined with and displayed along with my-room display screen, as shown in FIG. 7E (step A13→A14, A15).

Thus, the user can select any room part images, compose a desired my room image, and then display it.

As described above with reference to FIG. 8A, when a my-room display picture which includes a part image in which a letter is inserted into a drop in the door is displayed, which represent that room part images are "upgradable" (that is, the number of part images is increasable) in a state where upgrade data is stored in the upgrade data register 17c of RAM 17, a guide message representing that the part images are "upgradable" is displayed on the display unit 13 when the letter on the my-room display picture is pen touched, as shown in FIG. 8B (step A21→A22).

Figure 9:
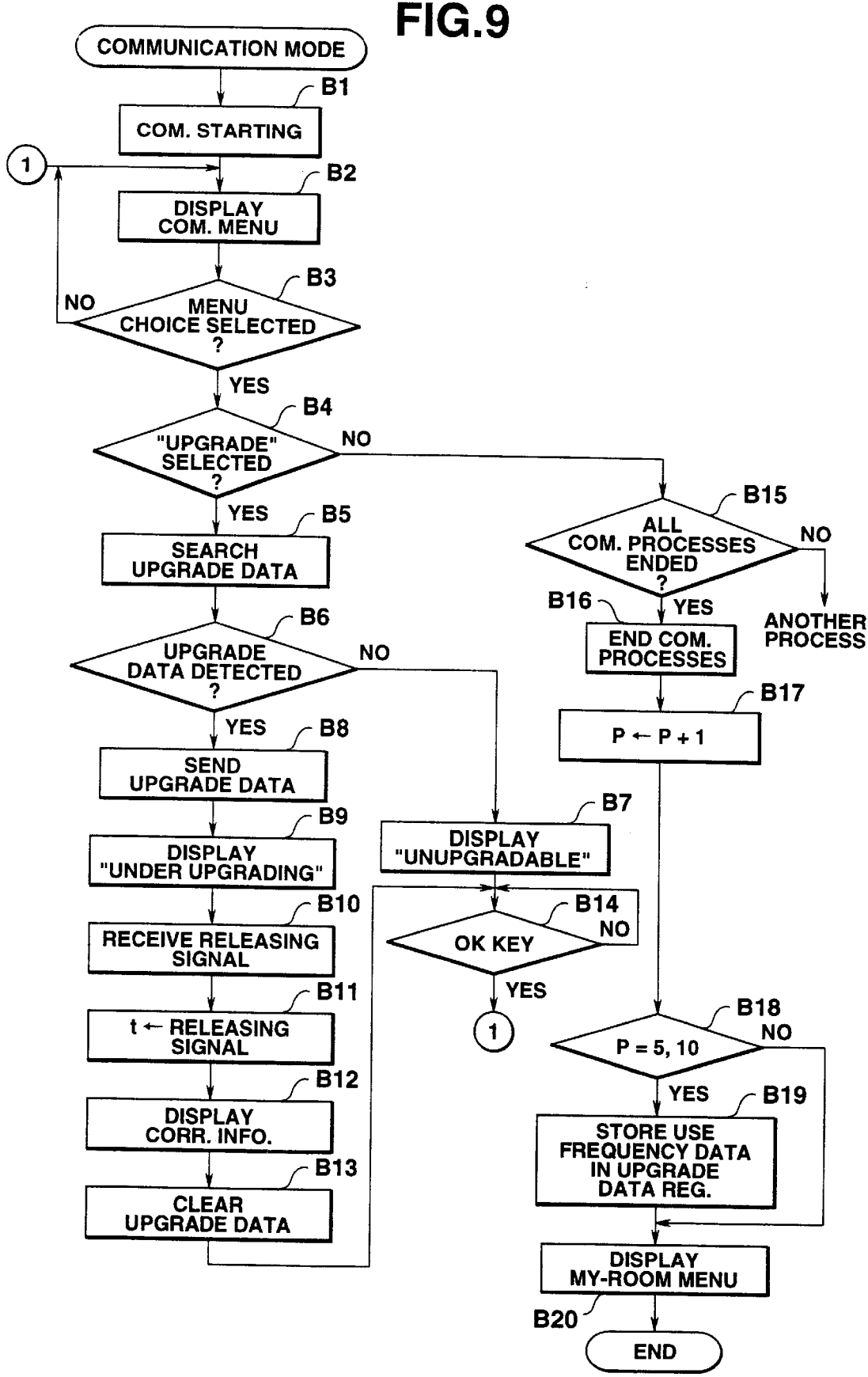
FIG. 9 is a flow chart of a communication mode process performed in the electronic notebook.

FIG. 9 is a flow chart of a communication mode process performed by the electronic notebook. FIGS. 10A–10D each show the display of an operation of the electronic notebook involved in the communication mode process performed by the electronic notebook (part 1). FIGS. 11A–11C each show the display of an operation of the electronic notebook involved in the communication mode process performed by the electronic notebook (part 2).

Figure 12:
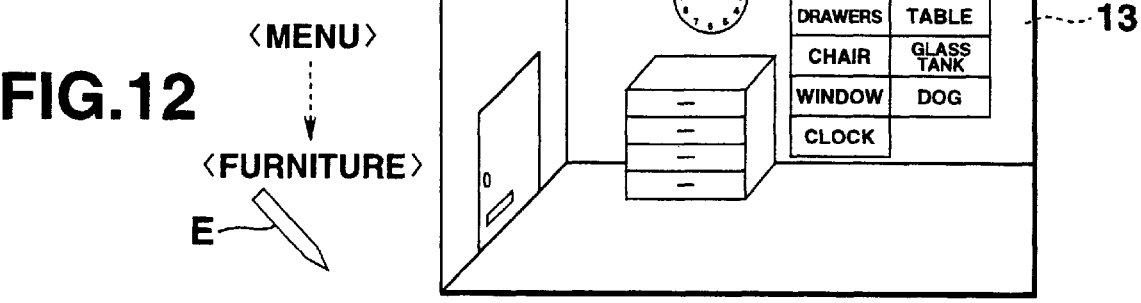
FIG. 12 shows a displayed state of a my-room part select screen involved in a my-room-mode process upgraded by the communication mode process of the electronic notebook.

FIG. 12 shows a displayed state of a my-room part select picture involved in a my-room-mode process performed after the "upgrading" of room part images by the communication mode process of the electronic notebook.

When the "personal computer" is pen touched on a menu select display picture displayed on the display unit 13 to set the communication mode, as shown in FIG. 10A, in the mode selecting and setting process (steps S1–S6), a message display picture for communication guidance to urge the user to connect the electronic notebook 10 and the modem 22 is displayed as an initial display picture on the display unit 13, as shown in FIG. 10B, and the communication mode process of FIG. 9 is started up.

Figure 10C:
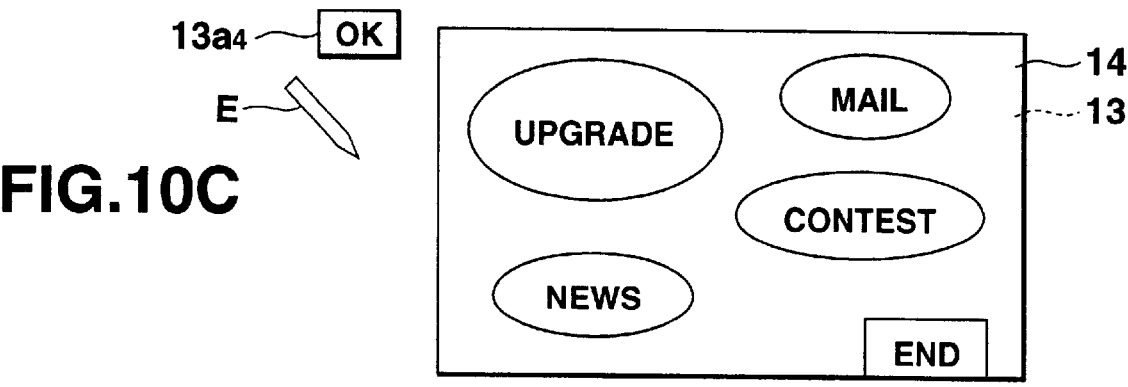
Figure 11A:
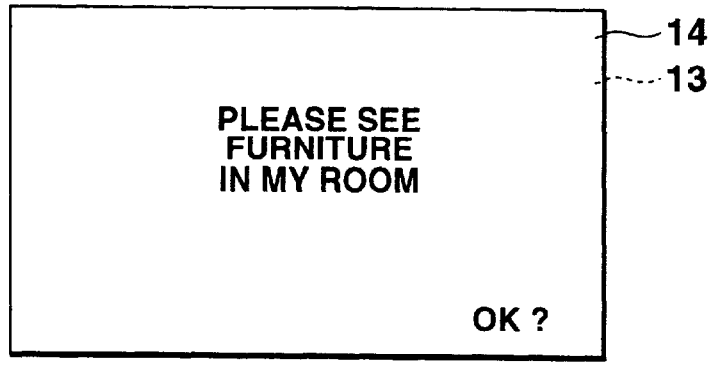
FIGS. 11A–11C each show the display of an operation of the electronic notebook involved in the communication mode (part 2)
Figure 11B:
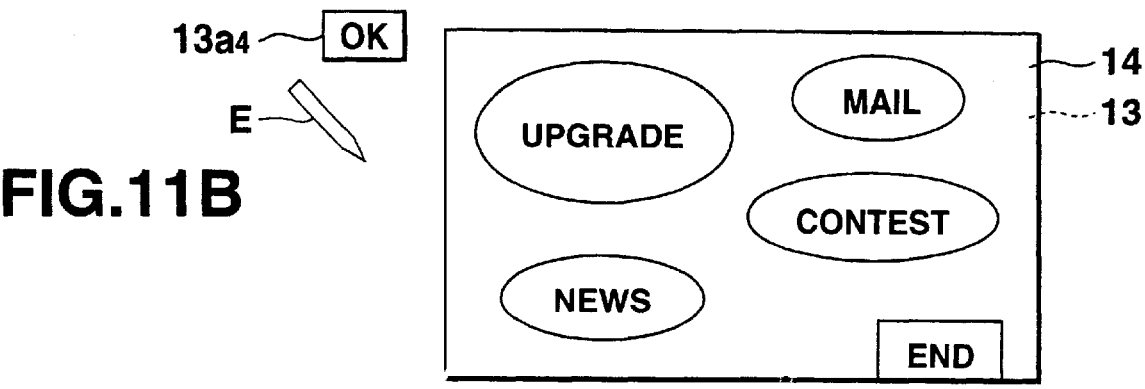
Figure 11C:
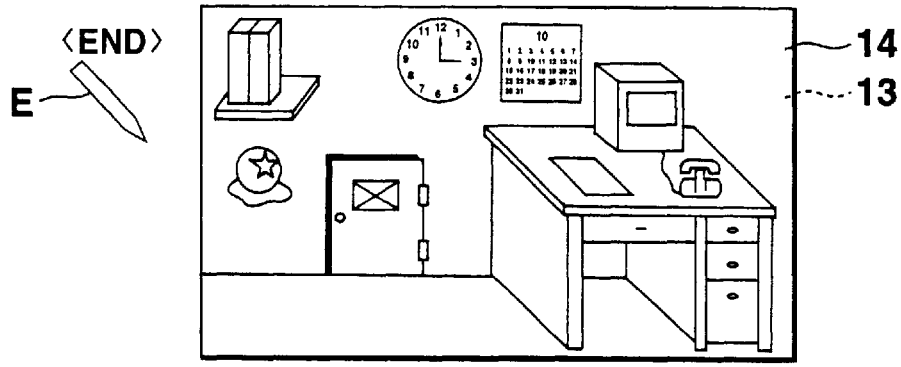

When the electronic notebook 10 is connected to the modem 22, and "communication" switch 22c is depressed, and "OK" key $13a_4$ displayed in the key operation area 13a of the display unit 13 is pen touched, as shown in FIG. 3, a dummy signal is sent to the host computer (not shown) from the send-receive circuit 21 via the modem 22 (FIG. 4) and the telephone line 24 to start the communication process and to perform a communication starting process such as an ID number checking operation and then to display a communication menu select display picture, as shown in FIG. 10C (steps B1, B2).

When a communication menu "upgrade" is pen touched and selected on the displayed communication menu select display picture, upgrade data is detected from the upgrade data register 17c of RAM 17, and it is determined whether there is upgrade data "5" or "10" (step B3→B4→B5, B6).

If it is determined that no upgrade data is detected from the upgrade data register 17c and that there is no upgrade data, a message that upgrading is impossible is displayed on the display unit 13 (step B6→B7).

Figure 10D:
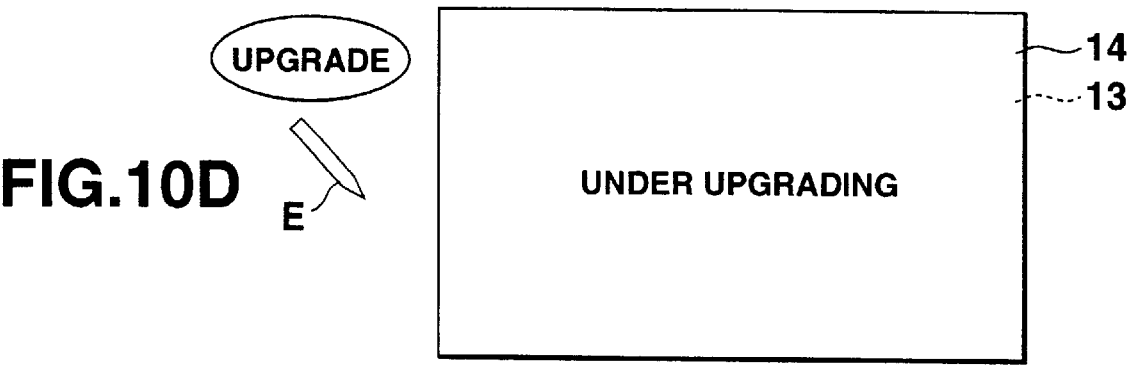

If, for example, upgrade data "10" is detected from the upgrade data register 17c and that it is determined that there is upgrade data, the upgrade data "10" stored in the upgrade data register 17c is sent along with a head dummy signal from the sent-receive circuit 21 to the modem 22, and as shown in FIG. 10D, message data "under upgrading" is displayed on the display unit 13 (step B6→B8, B9).

The notebook 10 then receives from the host computer the second-stage limitation releasing signal to release the notebook from the limitation on "upgrading" that is, an increase in the number of my-room part images to be selected, in correspondence to the upgrade data "10" sent to the host computer 24, and upgrade level "2" corresponding to the second-stage limitation releasing signal is set in the upgrade status register t of RAM 17 (steps B10, B11).

As shown in FIG. 11A, in response to this operation, a guidance message to inform the user that the number of my-room part images have been "upgraded" is displayed and the upgrade data "10" stored in the upgrade data register 17b is cleared to "0" (steps B12, B13).

When "OK" key $13a_4$ displayed on the key operation area 13a of the display unit 13 is pen touched in a state where the message "upgrading is impossible" is displayed at step B7 or the message "already upgraded" is displayed at step B12, the communication menu select display picture is again displayed on the display unit 13, as shown in FIG. 11B (step B14→B2).

When an "end" key displayed also on the communication menu select display picture is pen touched because the upgrade communication process or another communication process such as "mail", "news" or "contest" has ended based on a corresponding other communication menu element, a communication end signal is sent to the host computer to terminate the series of the communication processes to increment by one the use frequency data in the use frequency register P and it is then determined whether the use frequency data has reached "5" or "10" (step B15→B16, B17, B18).

If it is determined that the use frequency data is not "5" or "10", the my-room menu display picture is restored, as shown in FIG. 11C. If it is determined that the use frequency data is "5" or "10", this use frequency data is stored in the upgrade register 17c and the my-room menu display picture is restored in a manner similar to that mentioned above (step B18→B20 or B19, B20).

When "furniture" is pen touched in the displayed my-room menu display picture (FIG. 7C) in the my-room mode process in a state where the upgrade level in the upgrade status register t is increased to the second upgrade status "2" after the communication process "upgrade" of the communication mode process, all pieces of furniture image data and animal/plant image data are read out from the my-room part subROM 16a, and a my-room part selecting display picture in which any part image is selected from all pieces of furniture, animal, and plant images corresponding to the all pieces of furniture and animal and plant image data is displayed on the display unit 13 (step A2→A8→A10→A18, A19, A20).

More specifically, each time each of the "clean" process in the my-room mode process and the communication mode process ends, the use frequency data is incremented. When the use frequency data becomes "5" or "10", it is set as upgrade data in the upgrade data register 17c. When the upgrading process in the communication mode is performed between the notebook and the host computer in a state where the upgrade data "5" or "10" is set in the upgrade data register 17c, the first or second stage limitation releasing signal corresponding to the upgrade data "5" or "10" is sent back to the notebook 10 and the upgrade level is incremented from "0"for the normal state to "1" for the first stage upgrade level or "2" for the second upgrade level. Thus, the number of my- room part images to be selected in the my-room mode process is "upgraded" or increased to thereby produce and display my room image in a manner free from getting tired.

Figure 13:
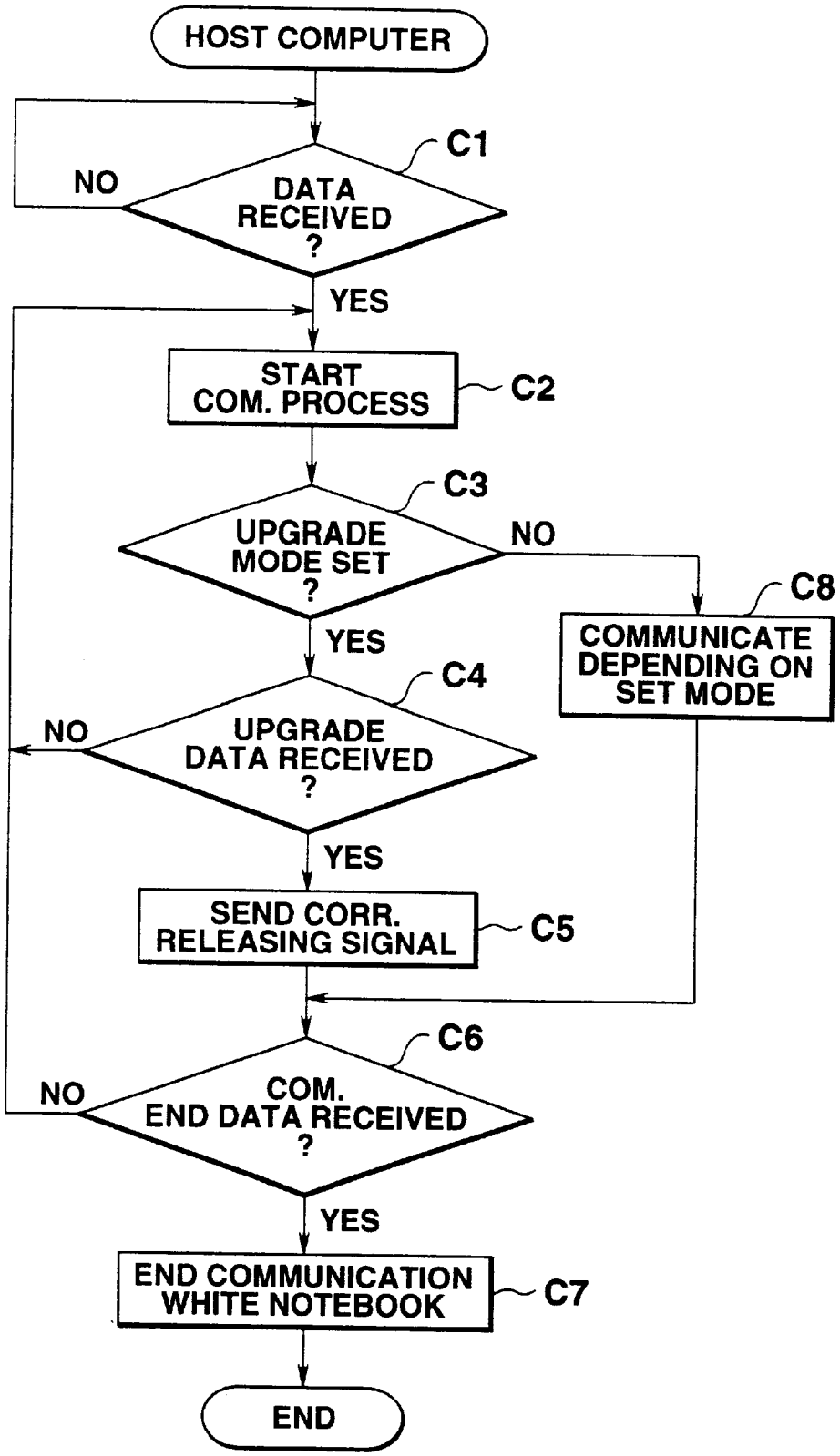
FIG. 13 is a flow chart of a communication process of a host computer depending on the communication mode process of the electronic notebook.

FIG. 13 is a flow chart of a communication process performed by the host computer in correspondence to the communication mode process of the notebook.

When the computer receives data from the notebook 10 via the modem 22 and the telephone line 24, it starts a communication process, for example, by checking an ID number of the notebook 10 (step C1→C2).

When the computer determines that the notebook 10 is set in the upgrade mode on the basis of the data received from the notebook 10, the computer is placed in a state where it waits for incoming upgrade data (step C3→C4).

When the computer receives, for example, upgrade data "10" from the notebook 10, it sends the second stage limitation releasing signal to the notebook 10 (step C4→C5).

When the notebook 10 is set in a communication mode other than the upgrade mode, the host computer performs a communication process with the notebook depending on the set mode (step C8).

When the computer receives a communication end signal from the notebook 10, the communication process with the notebook ends (step C6→C7).

In summary, according to the notebook 10 and the host computer, each time each of the "clean" process in the my-room mode process or the communication mode process ends, the use frequency data is incremented by one. When the use frequency data becomes "5" or "10", it is set as upgrade data in the upgrade data register. When the upgrading process is performed in the communication mode between the notebook and the computer in the state where the upgrade data is set in the upgrade data register, the first or second stage limitation releasing signal corresponding to the upgrade data "5" or "10" is sent back from the computer to the notebook. Thus, the upgrade level increases from "0" for the normal upgrade level to "1" for the first stage upgrade level or to "2" for the second stage upgrade level. Therefore, the number of my-room parts to be selected in the my-room mode process is "upgraded" or increased depending on the use frequency of the notebook 10 to thereby produce and display a my room in a manner free getting tired.

The modem 22 which connects the notebook 10 to the telephone line 24 is automatically switched to a send mode in accordance with send data from the notebook 10. When the send data disappears, the modem is automatically switched to a receive mode a predetermined time T later, so that no control system and lines for switching the send or receive mode of the notebook 10 are required to thereby reduce the size and cost of the notebook itself.

The processes described with reference to the embodiment, more specifically, the whole process performed by the notebook shown in the FIG. 5 flowchart, the my-room mode process shown in the FIG. 6 flowchart, the communication mode process shown in the FIG. 9 flowchart, and the host computer process shown in the FIG. 13 flowchart can be stored and delivered as a program executed by a computer in a recording medium such as a memory card (ROM or RAM card), a magnetic disk (such as a floppy or a hard disk), an optical disk (such as a CD-ROM or DVD) or a semiconductor memory. The computer reads a program recorded in such a recording medium and its operation is controlled by the program to fulfil the respective functions described with reference to the above-described embodiment and perform various processing operations in the manner mentioned above.

Second Embodiment

A second embodiment of the present invention will be described, using a word processor mode provided by the notebook 10. A word processor mode program is a program having only basic functions for the beginner read by a recording medium reader 30 and stored in a program register 17d of RAM 17 of FIG. 1. The register R of RAM 17 is used to count an accumulated time for which the user used the word processor mode.

Figure 14:
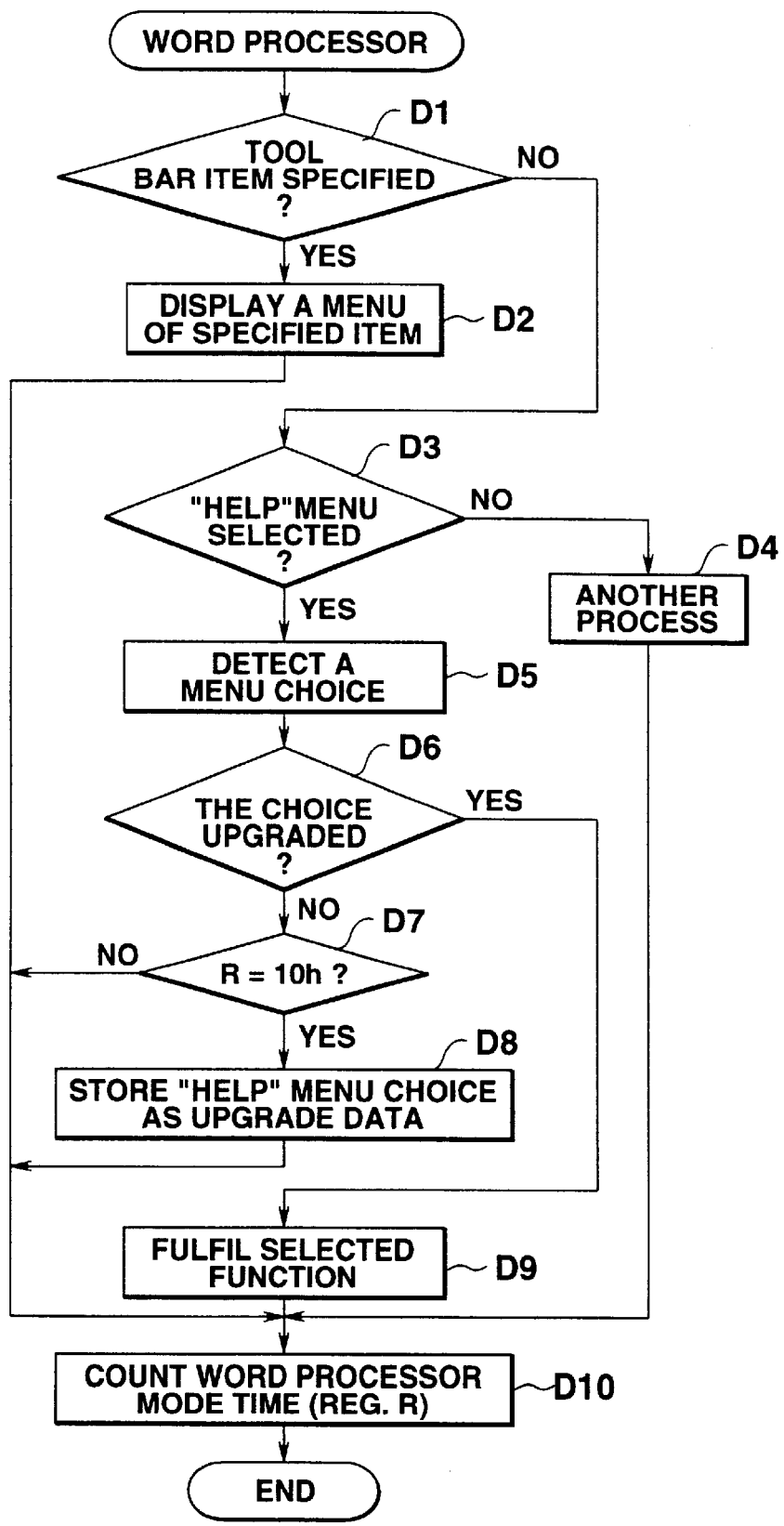
FIG. 14 is a flow chart of a word processor mode process of an electronic notebook as a second embodiment of the present invention.

FIG. 14 mainly shows various word processor functions to be fulfilled in the word processor mode.

Figure 15:
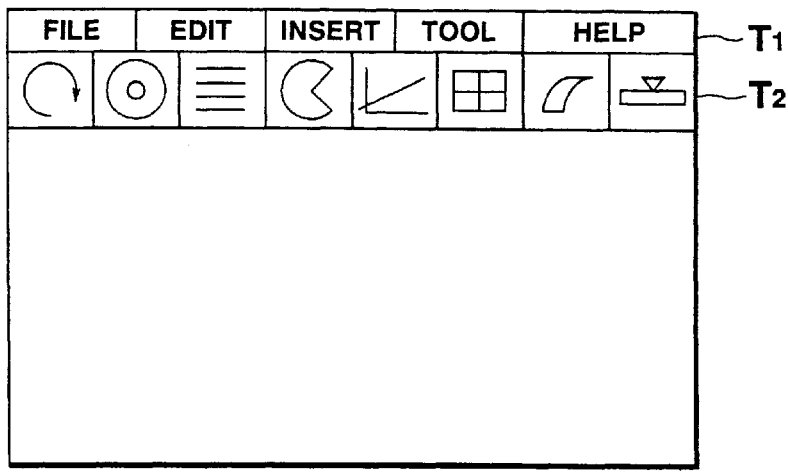
FIG. 15 shows a displayed state of an initial display screen appearing in the word processor mode process of the electronic notebook.

First, when an icon on a sheet of paper on a desk image is touched with the pen E on a displayed menu of FIG. 2, the word processor mode is started up to display an initial display picture as shown in FIG. 15 (FIG. 5, steps S1–S6).

When the user sequentially depicts loci, for example, of characters with the pen E on the tablet 14, the loci of the pen touch are depicted on the display 13. In response to this operation, the depicted loci are recognized and hence corresponding characters are entered (NO at step D1→NO at step D3→step D4).

Figure 16A:
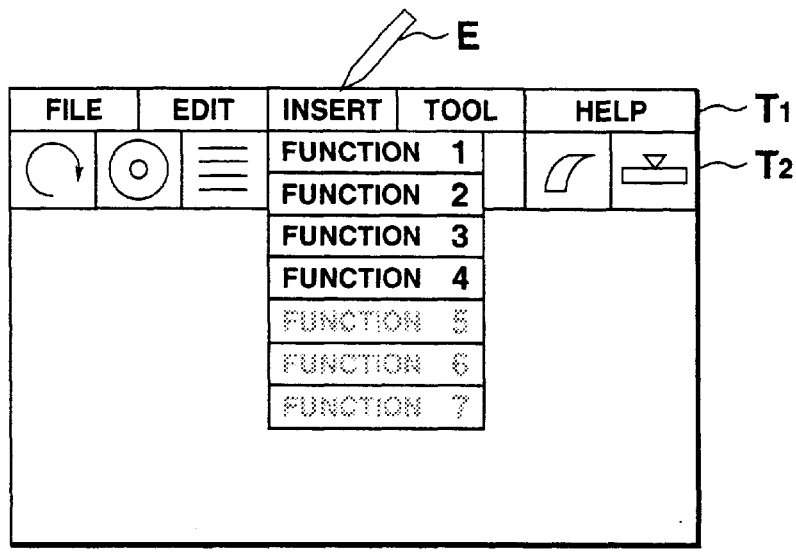
FIG. 16A shows a displayed state of a function selecting display screen involved in the word processor mode process before the electronic notebook is upgraded.

When any one of items of a tool bar T1 such as "File", "Edit", . . ., is selected to fulfil a corresponding function of the word processor to edit the input characters and others, control passes to step D1 to D2 to thereby display a menu of the selected item (FIG. 16A).

When any one choice of the menu of an item "help" is selected in the tool bar T1, control passes from step D1 to D3 where YES is determined. Then, at step D5 the selected one menu choice of the item "help" is detected.

It is then determined whether a function corresponding to the detected menu choice of the item "help" is already "upgraded" or added and installed (step D6). If so, at step D9 the function selected at step D6 is fulfilled.

If not at step D6, control passes to step D7, which determines whether the register R=10 or whether the accumulated time spent for the word processor mode has exceeded 10 hours (step D10). The register R counts the accumulated time in which the user has used the notebook in the word processor mode at step D10. When step D7 determines that R is more than 10 hours, the detected menu choice of the item "help" is stored as upgrade data in the upgrade data register 17c (step D8).

Thereafter, as in the first embodiment (FIG. 9), the notebook sends "upgrade" data to the host computer for upgrading the word processor functions. The host computer receives the sent upgrade data from the notebook 10, sends a program having functions corresponding to the upgrade data back to the notebook 10. The notebook 10 receives and stores the program to install new functions to thereby increase the number of functions usable in the word processor mode. While the notebook 10 receives the releasing signal from the host computer at step B10 of FIG. 9 in the first embodiment, the notebook receives the program having the new functions from the host computer in the second embodiment. At step B13 the notebook 10 clears the upgrade data and resets the register R to "0". Thereafter, the notebook starts again to count ten hours.

Figure 16B:
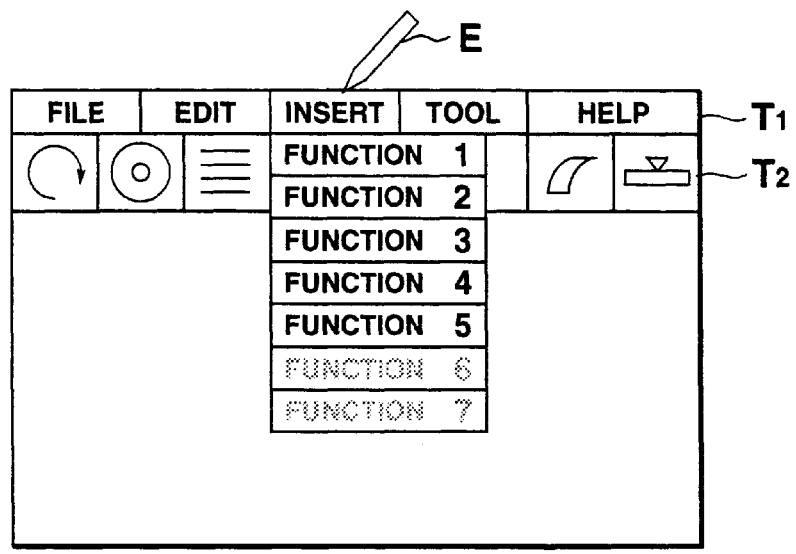
FIG. 16B shows a displayed state of the function selecting display screen involved in the word processor mode process after the electronic notebook is upgraded.

FIGS. 16A and 16B show display pictures which represent the upgraded and unupgraded states in the word processor mode, respectively.

For example, as shown in FIG. 16A, when a menu of an item "Insert" is displayed before "upgrading", the menu indicates that functions 1–4 are usable. Thereafter, when the user refers to the explanation about a choice "function 5" of a menu of the item "Insert" in the item "help", and it is detected that the menu choice represents an unupgraded function and that the time of use of the word processor mode is more than 10 hours, "upgrading" is possible. When the user then communicates with the host computer for upgrading purposes, the new "function 5" is installed in the notebook. When a menu of the item "Insert" is displayed again in the word processor mode, as shown in FIG. 16B, the new "function 5" is selectable and fulfillable.

Thus, according to the present invention, the processing is not determined by the functions provided initially in the notebook, but a new function is additionally obtained to thereby increase an interest in the use of the notebook.

What is claimed is:

1. A data processor having a plurality of fulfillable and unfulfillable functions to process data, and when a particular one of the unfulfillable functions is specified to process data, downloading data regarding a fulfillable function corresponding to the particular unfulfillable function from an external device, the data processor comprising:

a program storage section which stores a program having the plurality of fulfillable and unfulfillable functions;

a use time storage section which stores an accumulation of periods of time each for which the program was used;

selecting means for selecting any desired function from among the plurality of functions of the program during operation of the program;

first determining means for determining, based on the content of the program stored in said program storage section, whether the desired function selected by said selecting means is fulfillable;

second determining means, responsive to said first determining means determining that the desired function selected by said selecting means is unfulfillable, for determining whether the accumulation of periods of use times stored in said use time storage section is more than a predetermined time value;

communication executing means, responsive to said second determining means determining that the accumulation of the periods of use times stored in said use time storage section is more than the predetermined time value, for sending the external device a request to let the data processor have data representing a fulfillable function corresponding to the selected unfulfillable function and for receiving that data which the external device sent in response to the sent request;

installing means for installing the received data representing that function in the data processor; and reset means, responsive to said installing means installing the received data in the data processor, for resetting the accumulation of the periods of use times stored in said use time storage section.

2. A data processing method in which a data processor uses a plurality of fulfillable and unfulfillable functions to process data, and when a particular one of the unfulfillable functions is specified to process data, downloads data on a fulfillable function corresponding to the particular unfulfillable function from an external device, the method comprising the steps of:

storing an accumulation of periods of time each for which the program was used;

selecting any desired function from among the plurality of functions of the program during operation of the program;

determining, based on the content of the program, whether or not the selected desired function is fulfillable;

determining whether the stored accumulation of periods of time is more than a predetermined time value in response to determining that the selected function is unfulfillable;

sending the external device a request to let the data processor have data representing a fulfillable function corresponding to the selected unfulfillable function, in response to determining that the accumulation of periods of time is more than the predetermined time value, and receiving that function which the external device sent in response to the sent request;

installing the received function in the data processor; and resetting the accumulation of periods of time in response to installing the received function in the data processor.

3. A recording medium readable by a computer, including a program by which a data processor having a plurality of fulfillable and unfulfillable functions to process data, and when a particular one of the unfulfillable functions is specified to process data, the program downloads data regarding a fulfillable function corresponding to the particular unfulfillable function from an external device, the program causing the computer to operate as the data processor, the recording medium comprising:

a program storage section which stores a program having the plurality of fulfillable and unfulfillable functions;

a use time storage section which stores an accumulation of periods of time each for which the program was used;

selecting means for selecting any desired function from among the plurality of functions of the program during operation of the program;

first determining means for determining, based on the content of the program stored in said program storage section, whether the desired function selected by said selecting means is fulfillable;

second determining means, responsive to said first determining means determining that the desired function selected by said selecting means is unfulfillable, for determining whether the accumulation of periods of use times stored in said use time storage section is more than a predetermined time value;

communication executing means, responsive to said second determining means determining that the accumulation of periods of use times stored in said use time storage section is more than the predetermined time value, for sending the external device a request to let the data processor have data representing a fulfillable function corresponding to the selected unfulfillable function and for receiving that function which the external data processor sent in response to the sent request;

installing means for installing the received function in the first-mentioned data processor; and reset means, responsive to said installing means installing the received function in the data processor, for resetting the accumulation of periods of use times stored in said use time storage section.

* * * * *